United States Patent [19]
Valitutti et al.

[11] Patent Number: 5,612,516
[45] Date of Patent: Mar. 18, 1997

[54] ENCLOSURE FOR MULTIPLE VEHICULAR AUDIO SPEAKERS

[75] Inventors: Diane M. Valitutti, Sterling Heights; James Finck, Canton; Kurt M. Straub, Plymouth, all of Mich.

[73] Assignee: Chrysler Corporation, Auburn Hills, Mich.

[21] Appl. No.: 562,441

[22] Filed: Nov. 24, 1995

[51] Int. Cl.⁶ .................................................. H05K 5/00
[52] U.S. Cl. ............................................ 181/141; 181/150
[58] Field of Search ......................... 181/144, 141, 181/148, 150, 156, 152; 381/86, 88, 156, 205

[56] References Cited

U.S. PATENT DOCUMENTS

| | | | |
|---|---|---|---|
| 4,206,830 | 6/1980 | Sohma et al. | 181/141 |
| 4,493,389 | 1/1985 | Del Rosario | 181/141 X |
| 4,572,326 | 2/1986 | Hutchins | 181/150 |
| 4,582,162 | 4/1986 | Katsuno | 181/141 |
| 4,696,369 | 9/1987 | Dodrill | 181/141 |
| 4,756,382 | 7/1988 | Hudson, III | 181/156 |
| 4,924,962 | 5/1990 | Terai et al. | 181/141 |
| 5,191,177 | 3/1993 | Chi | 181/156 X |

*Primary Examiner*—Khanh Dang
*Attorney, Agent, or Firm*—Margaret A. Dobrowitsky

[57] ABSTRACT

A speaker enclosure for holding two 3.5" speakers and a 6.5" speaker is positionable on a rear shelf of the passenger compartment of a vehicle. The rear shelf extends transversely across the vehicle, and the speaker enclosure extends substantially the length of the rear shelf. The speaker enclosure includes three receptacles for receiving the speakers. An L-shaped tube directs sound emanating from the 6.5" speaker out of a front sound port of the enclosure, between the 3.5" speakers.

15 Claims, 1 Drawing Sheet

5,612,516

1

ENCLOSURE FOR MULTIPLE VEHICULAR AUDIO SPEAKERS

FIELD OF THE INVENTION

The present invention relates generally to vehicles, and more particularly to vehicle audio speaker enclosures.

BACKGROUND OF THE INVENTION

Existing audio systems for vehicles typically include one or more speakers that are mounted in various locations of the passenger compartment of a vehicle. The speakers are electrically connected to a radio, compact disc player, or cassette tape deck for playing audible sounds. Usually, several speakers are provided in the passenger compartment, with some speakers being designed to output audio sounds primarily in the treble range, and other speakers being designed to output audio sounds primarily in the bass range.

Apart from the number of speakers provided, it happens that the speakers are typically independently mounted in the vehicle. Independent mounting is sometimes necessary to optimize the sound distribution in the passenger compartment. Unfortunately, the cumulative sound from independently mounted speakers is not always well mixed. Furthermore, each independently mounted speaker must be installed separately from the other speakers, which increases vehicle assembly time and costs. As recognized by the present invention, however, it is possible to provide an enclosure in which several speakers can be conveniently mounted, prior to installing the enclosure in a vehicle.

Accordingly, it is an object of the present invention to provide an audio speaker enclosure for a vehicle that can hold a plurality of speakers. Another object of the present invention is to provide an audio speaker enclosure for a vehicle which effective outputs mixed sounds from a combination of bass speakers and treble speakers. Still another object of the present invention is to provide an audio speaker enclosure for a vehicle that is easy to use and cost-effective to manufacture.

SUMMARY OF THE INVENTION

An apparatus for holding a plurality of audio speakers in a passenger compartment of a vehicle includes a hollow plastic passenger side housing. The passenger side housing is formed with at least a first receptacle for receiving an audio speaker therein. A hollow plastic driver side housing is formed with at least a second receptacle for receiving an audio speaker therein. In accordance with the present invention, the driver side housing is connected to the passenger side housing to establish a speaker enclosure that extends across substantially the entire width of the passenger compartment. Further, a third receptacle is formed in the speaker enclosure for receiving an audio speaker therein, and a tube is positioned in the speaker enclosure for directing and controlling sound emanating from the third receptacle out of the speaker enclosure.

The vehicle defines a transverse dimension and a longitudinal dimension, and the tube preferably is L-shaped, so that the tube can have a relatively long length for establishing which frequencies are transmitted through it, while fitting within the enclosure. Moreover, the speaker enclosure defines a front side with respect to the vehicle, and the apparatus further includes a front trim panel covering the front side. In the preferred embodiment, the trim panel includes first and second pluralities of sound holes respectively oriented over the first and second receptacles. If desired, opposed guide wings can respectively protrude transversely outwardly from the housings. The apparatus can additionally include first, second, and third speakers respectively positioned in the first, second, and third receptacles.

In another aspect of the present invention, an apparatus is disclosed for holding a plurality of audio speakers in a vehicle which has a passenger compartment and a rear shelf extending transversely across the passenger compartment. The apparatus includes a hollow plastic speaker enclosure positionable on the rear shelf and extending substantially the length of the rear shelf. Also, the apparatus includes a plurality of receptacles formed in the enclosure for receiving respective audio speakers therein.

In still another aspect, a vehicle is disclosed which incorporates the speaker enclosure of the present invention.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
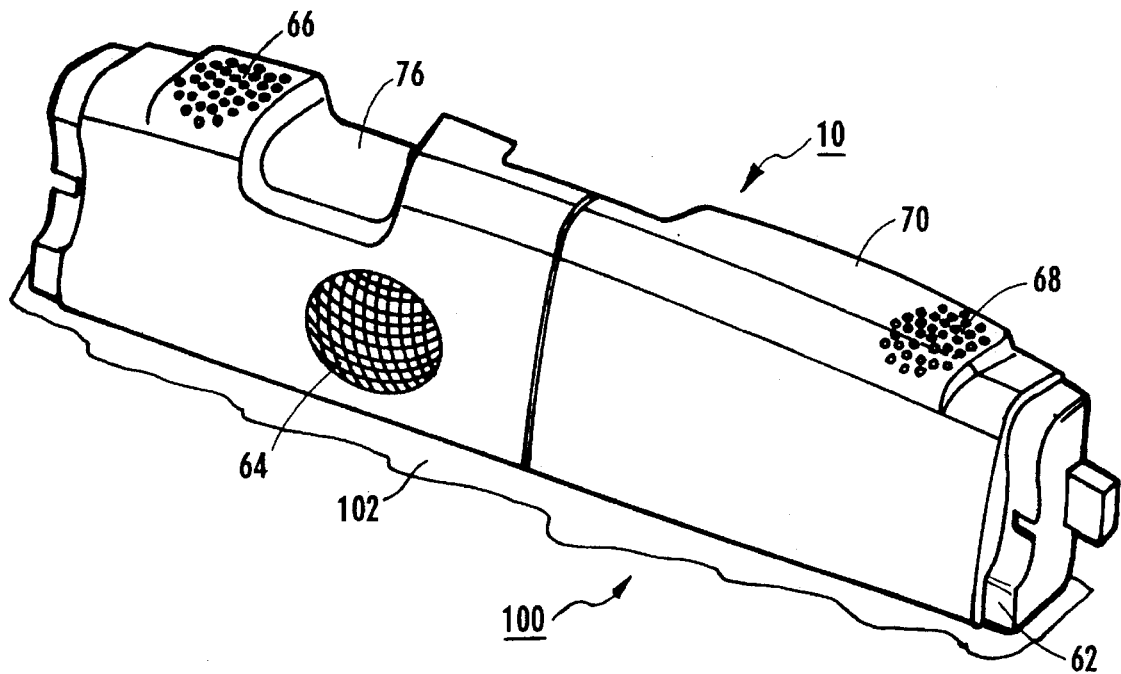
FIG. 1 is a perspective view of the speaker enclosure system of the present invention in its intended environment.

Referring initially to FIG. 1, a vehicle, generally designated 100, includes a passenger compartment rear shelf 102 that extends transversely across the vehicle 100, substantially from side to side of the passenger compartment. A speaker enclosure, generally designated 10, is positioned on the rear shelf 102. As shown, the speaker enclosure 10 extends substantially completely across the rear shelf 102. In other words, the speaker enclosure 10 extends transversely across the passenger compartment of the vehicle 100, substantially from side to side of the passenger compartment.

Figure 2:
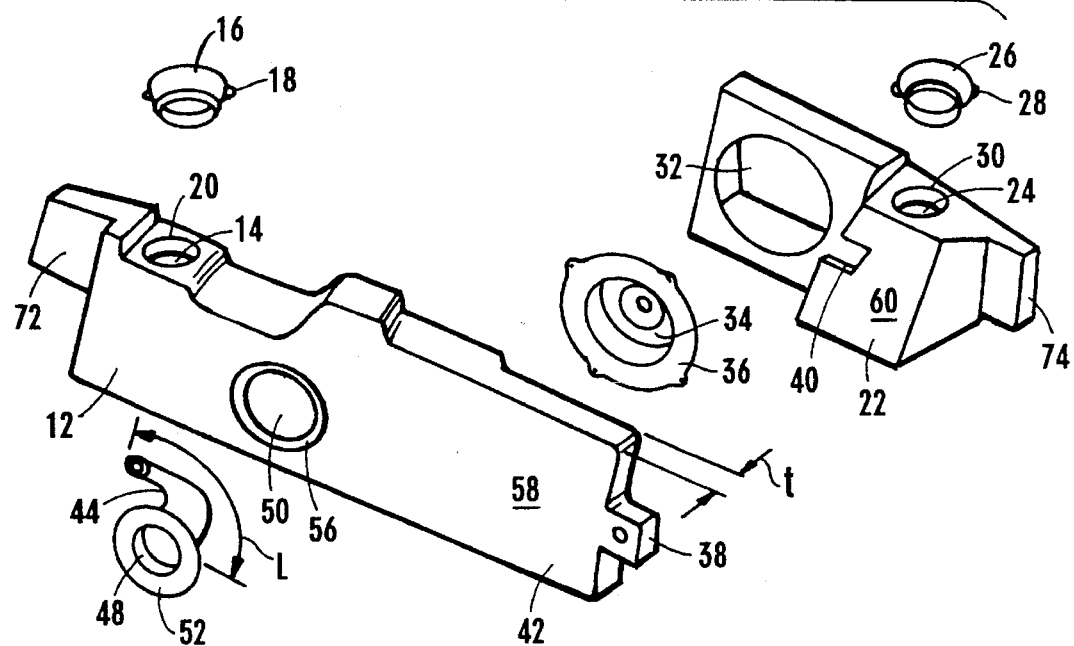
FIG. 2 is an exploded perspective view of the speaker enclosure system, with the front trim cover removed for clarity.

As shown in cross-reference to FIGS. 1 and 2, the speaker enclosure 10 includes a hollow plastic passenger side housing 12. The passenger side housing 12 is formed with a cylindrically-shaped, generally vertically-oriented passenger side speaker receptacle 14 that is configured for receiving an audio speaker 16. Preferably, the audio speaker 16 is a 3.5" audio speaker that is formed with a flange 18. As can be appreciated in reference to FIG. 2, the flange 18 is bolted to a flat surface 20 that circumscribes the passenger side speaker receptacle 14. Thereby, when the speaker 16 is engaged with the receptacle 14, sound emitted from the speaker 16 is directed upwardly in the passenger compartment of the vehicle 100, for direction of the sound along the deck lid of the vehicle 100.

Additionally, the speaker enclosure 10 includes a hollow plastic driver side housing 22. The driver side housing 22 is formed with a driver side audio speaker receptacle 24 that is configured for receiving an audio speaker 26. Preferably, the audio speaker 26 is a 3.5" audio speaker that is formed with a flange 28. As can be appreciated in reference to FIG. 2, the flange 28 is bolted to a flat surface 30 that circumscribes the driver side speaker receptacle 24. Thereby, when the speaker 26 is engaged with the receptacle 24, sound emitted from the speaker 26 is directed upwardly in the passenger compartment of the vehicle 100.

FIG. 2 further shows that the driver side housing 22 is formed with a cylindrical speaker receptacle 32, the axis of which is parallel to the longitudinal axis of the vehicle 100. A speaker, preferably a 6.5" dual-voice coil driver speaker 34, is positioned against the driver side housing 22 to cover the speaker receptacle 32. Advantageously, the speaker 34 includes a flange 36 that is bolted to the driver side housing 22. If desired, a 4-band parametrically-equalized amplifier (not shown) can be electrically connected to the speaker 34 for amplifying selected frequencies generated by the speaker 34.

In accordance with the present invention, the driver side housing 22 is bolted to the passenger side housing 12, with the speaker 34 sandwiched therebetween. In the preferred embodiment, the passenger side housing 12 includes a bolting flange 38 which is received in a flange receptacle 40 of the driver side housing 22, and a screw or bolt (not shown) is threadably engaged with the flange 38 and receptacle 40 to hold the housings 12, 22 together. Additional screws or bolts (not shown) further hold the housings 12, 22 together in accordance with well-known principles.

It can accordingly be appreciated in reference to FIG. 2 that sound emanating from the speaker 34 is directed into the passenger side housing 12. It can be further appreciated that the sound is reflected by a front surface 42 of the passenger side housing 12 to propagate transversely across the housing 12, within the housing 12. To control, i.e., to establish, which frequency or frequencies generated by the speaker 34 are preferentially directed longitudinally forward into the passenger compartment, an L-shaped tube 44 is positioned in the passenger side housing 12. In accordance with the present invention, the dimensions of the tube 44, and in particular the total length "L" of the tube 44, are established as appropriate for the desired frequencies. In one presently preferred embodiment, the tube 44 has a length "L" of about seven inches (7"). As recognized by the present invention, by configuring the tube 44 as an "L", the tube 44 can have a relatively long length and yet fit comfortably within the enclosure 10.

In the preferred embodiment shown, the tube 44 is oval-shaped in transverse cross-section and L-shaped in longitudinal cross-section. With this combination of structure, the tube 44 directs sound propagating from an entry end 46 out of an exit end 48 toward an opening 50 formed in the passenger side housing 12. As shown, the ends 46, 48 of the tube 44 are orthogonal to each other. Also, as mentioned above the dimensions of the tube 44 establish which frequencies generated by the speaker 34 are preferentially transmitted out of the opening 50.

If desired, the tube 44 can be attached to or formed integrally with a flanged connector 52 that is positionable in the opening 50. The connector 52 is a disc-shaped flange which is bolted to a lip 56 of the opening 50.

Preferably, front sides 58, 60 of the housings 12, 22 face frontward with respect to the vehicle 100, and a front trim panel 62 (FIG. 1) covers the front sides 58, 60. In cross-reference to FIGS. 1 and 2, a sound-permeable grille 64 is engaged with the trim panel 62 to cover the opening 50. Moreover, the trim panel 62 includes first and second pluralities 66, 68 of sound holes. The pluralities 66, 68 of sound holes can, as shown, be formed in a top surface 70 of the trim panel 62 and respectively oriented over the speaker receptacles 14, 24. Alternatively, the pluralities 66, 68 of sound holes can be established by respective grilles (not shown) that are attached over the speaker receptacles 14, 24.

As envisioned by the present invention, structure can be provided on the speaker assembly 10 to clear or otherwise cooperate with interfering structure of the vehicle 100. For example, a somewhat parallelepiped-shaped passenger side wing 72 can be formed on the passenger side housing 12 and extend transversely away therefrom, to guide, support, and protect seat belt components (not shown) of the vehicle 100. Likewise, a somewhat parallelepiped-shaped driver side wing 74 can be formed on the driver side housing 22 and extend transversely away therefrom, to cooperate with seat belt components. Further, a channel 76 can be formed in the top surface 70 of the trim panel 62 to clear interfering structure of the vehicle 100.

Per the present invention, the passenger side housing 12 and driver side housing 22 are advantageously formed by roto-casting. As recognized by the present invention, by making the housings 12, 22 by roto-casting, the housings 12, 22 can be formed with relatively large thicknesses "t" of about four to seven millimeters (4 mm–7 mm), and preferably about six and thirty five hundredths of a millimeter (6.35 mm), thereby increasing the structural stability of the speaker enclosure 10 vis-a-vis a relatively thinner, injection-molded enclosure. Such increased structural stability results in minimal deformation and/or vibration of the enclosure 10 when large amplitude sound waves propagate through the enclosure 10.

Further, as recognized herein by configuring the speaker enclosure 10 to extend substantially completely across the vehicle 100, the vehicle 100 is advantageously stiffened. Moreover, the speaker enclosure 10 can both function as a guide for a convertible roof, and as a boundary between the passenger compartment and trunk of the vehicle 100, owing to its configuration disclosed above.

While the particular ENCLOSURE FOR MULTIPLE VEHICULAR AUDIO SPEAKERS as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. An apparatus for holding a plurality of audio speakers in a passenger compartment of a vehicle defining a passenger side, a driver side, and a passenger compartment width therebetween, comprising:

a hollow plastic passenger side housing formed with at least a first receptacle for receiving an audio speaker therein;

a hollow plastic driver side housing formed with at least a second receptacle for receiving an audio speaker therein, the driver side housing being connected to the passenger side housing to establish a speaker enclosure, wherein the speaker enclosure extends across substantially the passenger compartment width when positioned therein;

a third receptacle formed in the speaker enclosure for receiving an audio speaker therein; and a tube positioned in the speaker enclosure for directing sound emanating from the third receptacle out of the speaker enclosure.

2. The apparatus of claim 1, wherein the vehicle defines a transverse dimension and a longitudinal dimension, and the tube is L-shaped, the tube defining a length in the longitudinal dimension, the length establishing which frequencies are transmitted through the tube.

3. The apparatus of claim 2, wherein the speaker enclosure defines a front side with respect to the vehicle, and the apparatus further comprises a front trim panel covering the front side.

4. The apparatus of claim 3, wherein the trim panel includes first and second pluralities of sound holes respectively oriented over the first and second receptacles.

5. The apparatus of claim 4, further comprising opposed guide wings respectively protruding transversely outwardly from the housings.

6. The apparatus of claim 5, further comprising first, second, and third speakers respectively positioned in the first, second, and third receptacles.

7. An apparatus for holding a plurality of audio speakers in a vehicle having a passenger compartment and a rear shelf extending transversely across the passenger compartment, comprising:

a hollow plastic speaker enclosure positionable on the rear shelf and extending substantially a length of the rear shelf, the speaker enclosure including a hollow plastic first side housing formed with at least a first receptacle for receiving an audio speaker therein and a hollow plastic second side housing formed with at least a second receptacle for receiving an audio speaker therein, the second side housing being connected to the first side housing; and a tube positioned in the speaker enclosure for directing sound emanating from one of the receptacles out of the speaker enclosure.

8. The apparatus of claim 7, wherein the tube is L-shaped.

9. The apparatus of claim 8, wherein the speaker enclosure defines a front side with respect to the vehicle, and the apparatus further comprises a front trim panel covering the front side.

10. The apparatus of claim 9, wherein the trim panel includes first and second pluralities of sound holes respectively oriented over the first and second receptacles.

11. The apparatus of claim 10, further comprising opposed guide wings respectively protruding transversely outwardly from the housings.

12. The apparatus of claim 11, wherein the speaker enclosure further comprises a third speaker positioned in a third receptacle.

13. An automobile, comprising:

a passenger compartment rear shelf;

a plurality of audio speakers;

a hollow plastic speaker enclosure positioned on the rear shelf and extending substantially a length of the rear shelf; and a plurality of receptacles formed in the enclosure, each receptacle being configured for receiving a respective audio speaker therein; and an L-shaped tube positioned in the speaker enclosure for directing sound emanating from one of the receptacles out of the speaker enclosure.

14. The automobile of claim 13, wherein the automobile defines a passenger side and a driver side, and the speaker enclosure includes:

a hollow plastic passenger side housing formed with at least a first receptacle for receiving an audio speaker therein;

a hollow plastic driver side housing formed with at least a second receptacle for receiving an audio speaker therein, the driver side housing being connected to the passenger side housing.

15. The automobile of claim 14, further comprising opposed guide wings respectively protruding transversely outwardly from the housings.

\* \* \* \* \*